(12) United States Patent
Van de Beek (10) Patent No.: US 8,571,093 B1
(45) Date of Patent: Oct. 29, 2013

(54) COMMUNICATION INTERFACE FOR GALVANIC ISOLATION

(75) Inventor: Remco Van de Beek, Eindhoven (NL)

(73) Assignee: NXP B.V., Eindhoven (NL)

( * ) Notice: Subject to any disclaimer, the term of this patent is extended or adjusted under 35 U.S.C. 154(b) by 65 days.

(21) Appl. No.: 13/454,654

(22) Filed: Apr. 24, 2012

(51) Int. Cl.
*H04B 1/38* (2006.01)

(52) U.S. Cl.
USPC ........... 375/219; 375/220; 375/221; 375/254; 375/286; 375/288; 375/295; 375/316; 375/296; 375/346; 375/349

(58) Field of Classification Search
USPC ......... 375/219, 220, 221, 254, 286, 288, 295, 375/316, 296, 346, 349
See application file for complete search history.

(56) References Cited

U.S. PATENT DOCUMENTS

| | | | |
|---|---|---|---|
| 3,273,033 | A | 9/1966 | Rossmeisl |
| 4,292,595 | A | 9/1981 | Smith |
| 4,748,419 | A | 5/1988 | Somerville |
| 5,187,637 | A | 2/1993 | Embree |
| 5,321,597 | A | 6/1994 | Alacoque |
| 5,341,040 | A * | 8/1994 | Garverick et al. .............. 326/27 |
| 6,329,834 | B1 * | 12/2001 | Krasnansky .................... 326/26 |
| 6,347,395 | B1 | 2/2002 | Payne et al. |
| 6,636,166 | B2 | 10/2003 | Sessions et al. |
| 6,839,862 | B2 | 1/2005 | Evoy et al. |
| 6,859,883 | B2 | 2/2005 | Svestka et al. |
| 6,882,046 | B2 | 4/2005 | Davenport et al. |
| 6,920,576 | B2 | 7/2005 | Ehmann |
| 7,302,247 | B2 | 11/2007 | Dupuis |
| 7,376,212 | B2 | 5/2008 | Dupuis |
| 7,421,028 | B2 | 9/2008 | Dupuis |
| 7,447,492 | B2 | 11/2008 | Dupuis |
| 7,460,604 | B2 | 12/2008 | Dupuis |
| 7,577,223 | B2 | 8/2009 | Alfano et al. |
| 7,650,130 | B2 | 1/2010 | Dupuis |
| 7,737,871 | B2 | 6/2010 | Leung et al. |
| 7,738,568 | B2 | 6/2010 | Alfano et al. |
| 7,755,400 | B2 | 7/2010 | Jordanger et al. |
| 7,821,428 | B2 | 10/2010 | Leung et al. |
| 7,856,219 | B2 | 12/2010 | Dupuis |
| 7,902,627 | B2 | 3/2011 | Dong et al. |
| 8,049,573 | B2 | 11/2011 | Alfano et al. |
| 8,064,872 | B2 | 11/2011 | Dupuis |
| 8,442,099 | B1 * | 5/2013 | Sederat ......................... 375/219 |
| 2002/0184544 | A1 | 12/2002 | Svestka et al. |
| 2009/0017773 | A1 | 1/2009 | Dupuis et al. |
| 2009/0213914 | A1 | 8/2009 | Dong et al. |
| 2010/0052826 | A1 | 3/2010 | Callahan et al. |
| 2010/0118918 | A1 | 5/2010 | Dupuis |
| 2011/0292977 | A1 * | 12/2011 | Farjadrad ...................... 375/220 |

OTHER PUBLICATIONS

Greg Smith, "Hybrid Isolation Amps Zap Price and Voltage Barriers" Electronic Design, Dec. 11, 1986, pp. 91-?.

(Continued)

*Primary Examiner* — Siu Lee (57) ABSTRACT

In one or more embodiments, a system is provided for communicating between different voltage domains using N+1 capacitive-coupled conductive lines to provide N communication channels. For instance, bi-directional communication (e.g., a first communication in a first direction and a second communication path in the opposite direction) may be provided using three capacitive-coupled signal paths. Two of the signal paths are used as single-ended (i.e., non-differential) signal paths. The third signal path is used to suppress voltage disturbances between two voltage domains.

19 Claims, 5 Drawing Sheets

(56) References Cited

OTHER PUBLICATIONS

Wally Meinel, et al., "Hermetic Analog Isolation Amplifier", Proceedings of the 1987 International Symposium on Microelectronics, Minneapolis, Sep. 1987.

Burr Brown, Noise Sources in Applications Using Capacitive Coupled Isolated Amplifiers, Application Bulletin, Burr Brown Corporation, 1993.

Burr Brown, Hybrid Isolation Amps Zap Price and Voltage Barriers, Application Bulletin, Burr Brown Corporation, 1994.

Burr Brown, An error analysis of the ISO102 in a small signal measuring application, Application Bulletin, Burr Brown Corporation, 1994.

Burr Brown, ISO 102, ISO 106 Signal Isolation Buffer Amplifiers, Datasheet, Burr Brown Corporation, 1995.

J. Basilio Simoes, et al., "The Optical Coupling of Analog Signals" IEEE Transaction on Nuclear Science, vol. 43, No. 3, Jun. 1996, pp. 1672-1674.

Stephen L. Diamond, "IEEE 1394: Status and growth path", IEEE Micro, Jun. 1996, pp. 75-78.

Thaddeus J. Gabara, et al., "Capacitive coupling and quantized feedback applied to conventional CMOS technology" IEEE Journal of Solid-State Circuits, vol. 32, No. 3, Mar. 1997.

Adrian Paskins, "The IEEE 1394 BUS", The Institution of Electrical Engineers Conference, May 12, 1997.

Richard Crisp, "Direct Rambus Technology: The New Main Memory Standard" IEEE Micro, Nov./Dec. 1997, pp. 18-28.

Thomas Nilsson, "A distributed combined heat and power plant control unit", Master Thesis, Linköping Institute of Technology, Dec. 16, 1997.

Scott Wayne, "Finding the Needle in a Haystack: Measuring Small differential voltages in the presence of large-common mode voltages", Analog Dialogue, 34-1, 2000, pp. 1-4.

Infineon Technologies, IVAX Integrated Voice & ADSL Transceiver, PEB35512, PEB55508, PEB3558, PEB4565, PEB4566, Datasheet, Infineon Technologies AG, 2001.

William B. Kuhn, et al., "An RF-based IEEE 1394 Ground Isolator designed in silicon-on-insulator process" Circuits and Systems, 2001. MWSCAS 2001. Proceedings of the 44th IEEE 2001 Midwest Symposium on ,vol. 2 , Aug. 14-17, 2001.

Scott Irwin, XILINX, "Usage Models for multi-gigabit serial transceivers", WP157, V.1.0, Mar. 15, 2002.

phyCORE-MCF548x Hardware Manual, PHYTEC Technology Holding Company, Jan. 2005.

LANTRONIX, Xpress-DR+Wireless, Datasheet, LANTRONIX, 2006.

Eugenio Culurciello, et al., "Capacitive inter-chip data and power transfer for 3-D VLSI" IEEE Trans. Circuits Syst. II, vol. 53, No. 12, pp. 1348-1352, 2006.

Geoffrey Marcus, et al., "A Monolithic Isolation Amplifier in silicon-on-isolator CMOS: Testing and Applications", Analog Integr. Circ. Sig. Process, Jun. 27, 2006.

* cited by examiner

COMMUNICATION INTERFACE FOR GALVANIC ISOLATION

Aspects of the present disclosure relate to apparatuses, devices and methods involving communication interfaces useful for galvanic isolation in circuits.

Galvanic isolation has been used for a variety of different applications. For instance, galvanic isolation can be provided between multiple integrated circuit chips, which can be located within the same package or in different packages. Signals can be passed between the integrated circuits using galvanic isolation techniques. Different galvanic isolation techniques have various undesirable tradeoffs in properties such as, but not necessarily limited to, signal propagation delays, power consumption, pulse width distortion and carrier frequency requirements.

One type of galvanic isolation involves the use of differential signaling and capacitive coupling. Differential signaling translates a data signal into a pair of out-of-phase signals that are transmitted on respective signal paths. A receiver recovers the signal as a difference in voltages on the two conductive lines. The differentially transmitted signals can be modulated in a number of different manners in order to convey data. The capacitive coupling on each signal path acts as a means of blocking DC voltages and attenuating low-frequency signals while transmitting high-frequency signals. Circuitry is typically included in a receiver to reject voltage transients (e.g., common mode signals) that may arise between the corresponding voltage domains.

However, this approach requires two signal paths for each communication channel between the two voltage domains. For example, bi-direction communication (i.e., a first communication channel in a first direction and a second communication channel in a second direction) requires four signal paths along with respective capacitive coupling circuits for each of the communication channels.

Aspects of the present disclosure relate generally to interfaces and methods relating to the applications discussed above. In one or more embodiments, the circuits of different voltage domains communicate over capacitive-coupled signal paths that use non-differential signaling techniques.

In one particular embodiment, a device is configured to communicate between two voltage domains using a plurality of signal paths that provide capacitive isolation between the voltage domains. The device includes a transceiver circuit having a receiver circuit configured to receive signal data over a first path of the plurality of signal paths and a transmitter circuit configured to transmit signal data over a second path of the plurality of signal paths. The transceiver includes a compensation circuit configured to compensate for ground transient from signal data carried on the first path based on a ground transient on the third signal path. In response to ground transient on the third signal path, the compensation circuit generates a compensation signal configured to compensate for the ground transient on the third signal path. The compensation signal is transmitted on the first signal path to compensate for ground transient on the first signal path.

In another embodiment, a communication system includes first and second single-ended signal lines. A communication device is connected to the first and second signal lines and configured to receive and decode signals from the first single-ended signal lines. The communication device detects ground transients on the second signal ended signal line and, based on the voltage of the second single-ended signal line, generates a compensation signal configured to compensate for the ground transients on the second signal-ended signal line. The device transmits the compensation signal on the first single-ended signal line to compensate for ground transients on the first signal path.

The above summary is not intended to describe each embodiment or every implementation of the present disclosure. The figures, detailed description, and claims that follow more particularly exemplify various embodiments.

Aspects of the present disclosure may be more completely understood in consideration of the detailed description of various embodiments of the present disclosure that follows in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

Embodiments of the present invention are believed to be applicable to communication methods, devices and systems involving multiple-conductive lines used for data communications between galvanically-isolated circuits. While the present invention is not necessarily limited in this context, various aspects of the invention may be appreciated through a discussion of related examples.

Aspects of the present disclosure relate to the transmission of data between circuits that are galvanically isolated from each other. The circuits communicate over a signal path that uses capacitive coupling and non-differential signaling techniques. In one or more embodiments, a system is provided for communicating between different voltage domains using N+1 capacitive-coupled conductive lines to provide N communication channels. For instance, bi-directional communication (e.g., a first communication in a first direction and a second communication path in the opposite direction) may be provided using three capacitive-coupled signal paths. Two of the signal paths are used as single-ended (i.e., non-differential) signal paths. The third signal path is used to suppress voltage disturbances between two voltage domains.

In one or more embodiments, the circuits of different voltage domains communicate over capacitive-coupled signal paths. Particular embodiments of the present disclosure are directed toward the use of capacitive-coupled conductive lines to provide non-differential (e.g., single-ended) signal paths between isolated voltage domains.

In one particular embodiment, a device is configured to communicate between two voltage domains using a plurality of signal paths that provide capacitive isolation between the voltage domains. The device includes a receiver circuit configured to receive signal data over a first one of the plurality of signal paths and a transmitter circuit configured to transmit signal data over a second one of the plurality of signal paths. The device includes a compensation circuit configured to compensate for ground transient from signal data carried on the first path in response to and based on a ground transient on the third signal path. The compensation circuit transmits the compensation signal on the first path to compensate for ground transient current from signal data carried on the first signal path.

In some embodiments, the compensation circuit includes first and second transconductance amplifier circuits. The first transconductance circuit has an input and an output connected to the third signal path. The second transconductance has an input connected to the third signal path and an output connected to the first signal path.

In some embodiments, the receiver circuit is configured to receive signal data over at least two signal paths and decode signal data received from each path independently. In such embodiments, the compensation circuit is further configured to transmit the compensation signal on the at least one additional path.

In some embodiments, the receiver circuit is configured to subtract a transient voltage on the third path from the signal received on the first path. Some embodiments may include a biasing circuit connected to the input of the receiver circuit and configured to bias the input of the receiver circuit at a DC voltage. For instance, the biasing circuit may include a transconductance amplifier circuit having a voltage-controlled input connected to a ground voltage via a capacitor. An output of the transconductance amplifier is connected to the input of the receiver circuit, and a feedback loop connects the output of the transconductance amplifier to the input of said transconductance amplifier.

In some embodiments, the device further includes a second receiver, a second transmitter, and a second compensation circuit, which operate in a different voltage domain than the first-mentioned receiver, transmitter, and compensation circuits. The second receiver circuit is configured to receive signal data over the second signal path, and the second transmitter circuit is configured to transmit signal data over the first signal path. The second compensation circuit is configured to generate a compensation signal in response to detecting a voltage transient on the third signal path. The second compensation circuit transmits the second compensation signal on the second signal path to compensate for ground transients on the second signal path.

Figure 1:
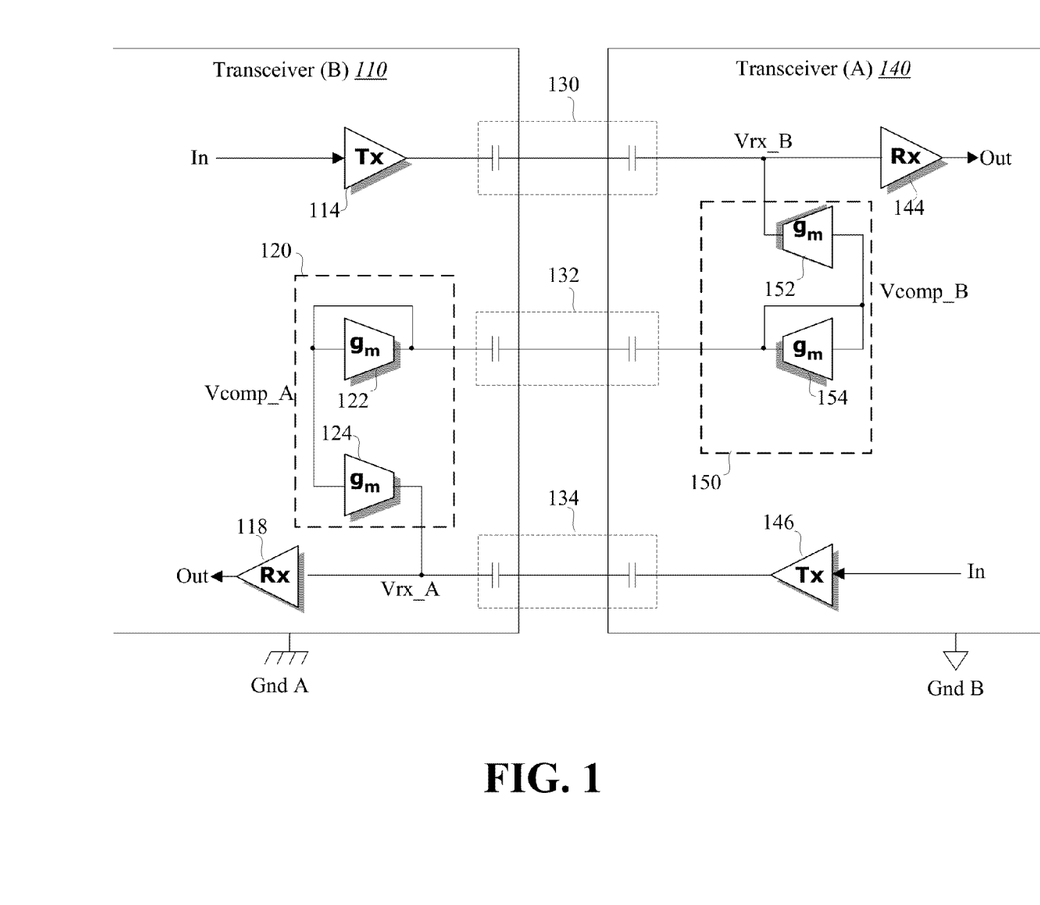
FIG. 1 depicts a system for communication between different voltage domains, consistent with embodiments of the present disclosure.

Turning now to the figures, FIG. 1 depicts a block diagram of a system for communication between voltage domains, consistent with embodiments of the present disclosure. In this example, the system includes first and second transceiver circuits (110 and 140) configured for bidirectional communication over three signal paths (130, 132, and 134). Each signal path capacitively couples transceiver 110 and transceiver 140.

The first transceiver 110 includes a transmitter circuit 114 configured to transmit signal data over a first one of signal paths 130, and a receiver circuit 118 is configured to receive signal data from a second one of the signal paths 134. The first transceiver 110 includes a compensation circuit 120 configured to generate a compensation signal configured to compensate for ground transient at node (Vcomp_A) based on voltage at the node. The compensation circuit 120 is configured to transmit the compensation signal on the third signal path 132 to reduce ground transient voltage at node (Vcomp_A). Similarly, the compensation circuit 120 is configured to transmit a buffered version of the compensation signal on the second signal path 134 to reduce ground transient voltage at node (Vrx_A).

Similarly, the second transceiver 140 includes a receiver circuit 144 configured to receive signal data from the first one of signal paths 130, and a transmitter circuit 146 configured to transmit signal data over second one of the signal paths 134 to the first transceiver circuit 110. The second transceiver 140 includes a compensation circuit 150 configured to generate a compensation signal configured to compensate for ground transient at node (Vcomp_B) based on voltage at the node. The compensation circuit 120 is configured to transmit the compensation signal on the third signal path 132 to reduce ground transient voltage at node (Vcomp_B). Similarly, The compensation circuit 150 is configured to transmit a buffered version of the compensation signal on the second signal path 134 to reduce ground transient voltage at node (Vrx_B).

Each compensation circuit (120/150) includes a first transconductance amplifier (122/154) configured to output a current on the third signal path 132 that is sufficient to remove ground transient voltage on node (VComp_A/VComp_B). Assuming that capacitors on line 130 are the same size as those on conductive line 132, the same amount of current should be sufficient to correct for ground transient voltages at receiver input node (Vrx_A/Vrx_B) of the transceiver circuits. Compensation circuit 150 includes a second transconductance amplifier 152 configured to generate the same current as that produced by the first transconductance amplifier 154. The transconductance amplifier transmits this current on capacitive-coupled signal path 130. As a result, ground transient on node Vrx_B is reduced. Similarly, compensation circuit 120 includes a second transconductance amplifier 124 configured to generate the same current as that produced by the first transconductance amplifier 122. The transconductance amplifier transmits this current on capacitive-coupled signal path 134 to reduce ground transient on receiver input node Vrx_B.

Figure 2:
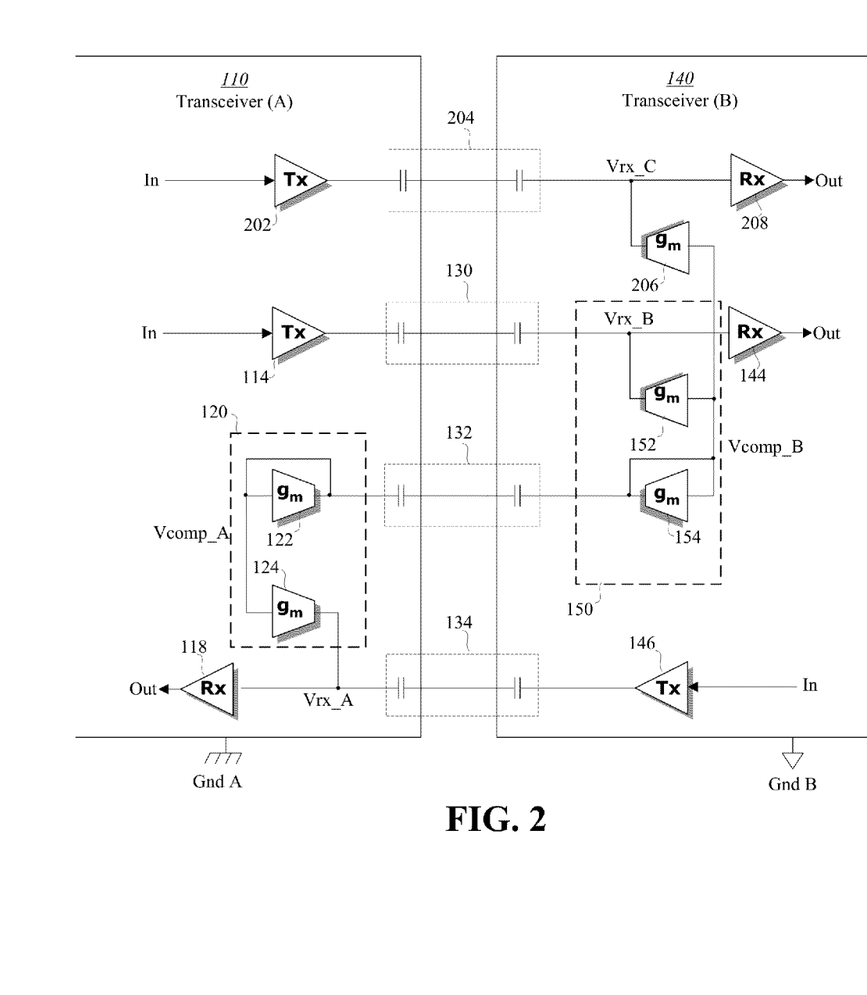
FIG. 2 depicts a system for communication between different voltage domains having two communication channels in each direction, consistent with embodiments of the present disclosure.

In some embodiments, the compensation circuits may be configured to compensate for ground transients on multiple receiver inputs in the same voltage domain. For example, FIG. 2 shows an alternate implementation of the system shown in FIG. 1 that includes an additional capacitive-coupled signal path. For ease of explanation, reference numbers of FIG. 1 are used in FIG. 2 for previously described elements. The capacitive-coupled signal path connects a second transmitter 202 to a second receiver 208. To reduce ground transient at receiver input node Vrx_C, the compensation circuit 150 of FIG. 1 is modified to include a third transconductance amplifier 206 configured to output a same current as transconductance amplifier 154 on signal path 204.

The transceiver and compensation circuit can be scaled to compensate for ground transients for even larger numbers of communication channels. For each new receiver channel to be added, a new transmitter (e.g., 202), a new capacitive-coupled signal path (e.g., 204), and a new receiver circuit 208 are added. A new transconductance amplifier (e.g., 206) is also added to compensation circuit 150 as described above.

Figure 3:
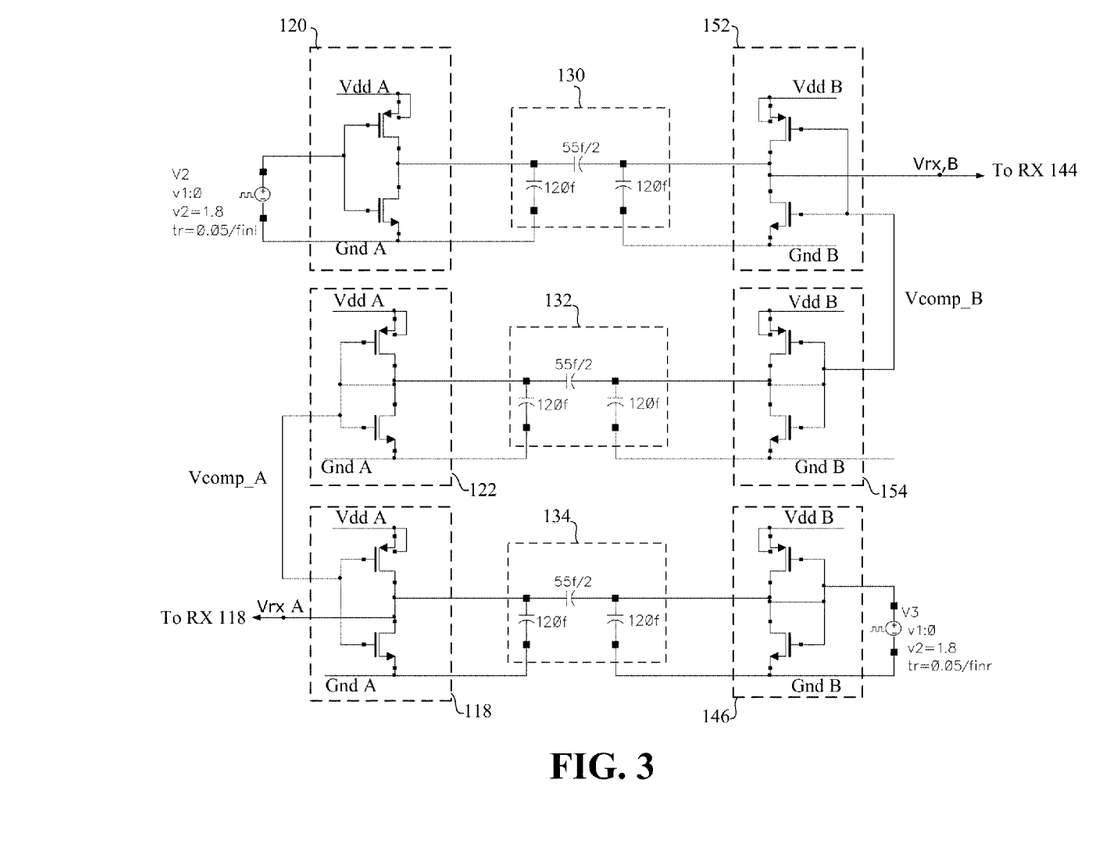
FIG. 3 shows a CMOS circuit that may be used to implement the communication system shown in FIG. 1, consistent with embodiments of the present disclosure.

FIG. 3 shows a CMOS circuit that may be used to implement one or more embodiments of the communication system shown in FIG. 1. In this example implementation, CMOS inverters are used to implement transmitter and transconductance amplifier circuits. For ease of explanation, circuits of FIG. 3 are described using the reference numbers presented in the discussion of FIG. 1.

Transmitter circuits 120 and 146 are implemented using respective CMOS inverters. In this example, the capacitive-coupled signal paths 130, 132, and 134 are each modeled as a coupling capacitor having a parasitic capacitor to the respective ground on both sides. The first transconductance amplifiers 122 and 154 of the compensation circuits are implemented using respective CMOS inverter circuits having an output and an input connected to the third capacitive-coupled signal path 132. Connecting the output of the transconductance amplifier to the input causes the amplifier to generate a current sufficient to remove ground transients on nodes Vcomp_A and Vcomp_B. Second transconductance amplifiers 118 and 152 of the respective compensation circuits are implemented using CMOS inverter circuits. The second transconductance amplifiers (118 and 152) are driven by respective compensation nodes (Vcomp_A and Vcomp_B) to cause the amplifiers to produce the same current as the respective first amplifiers (122 and 154) of the compensation circuits.

Figure 4:
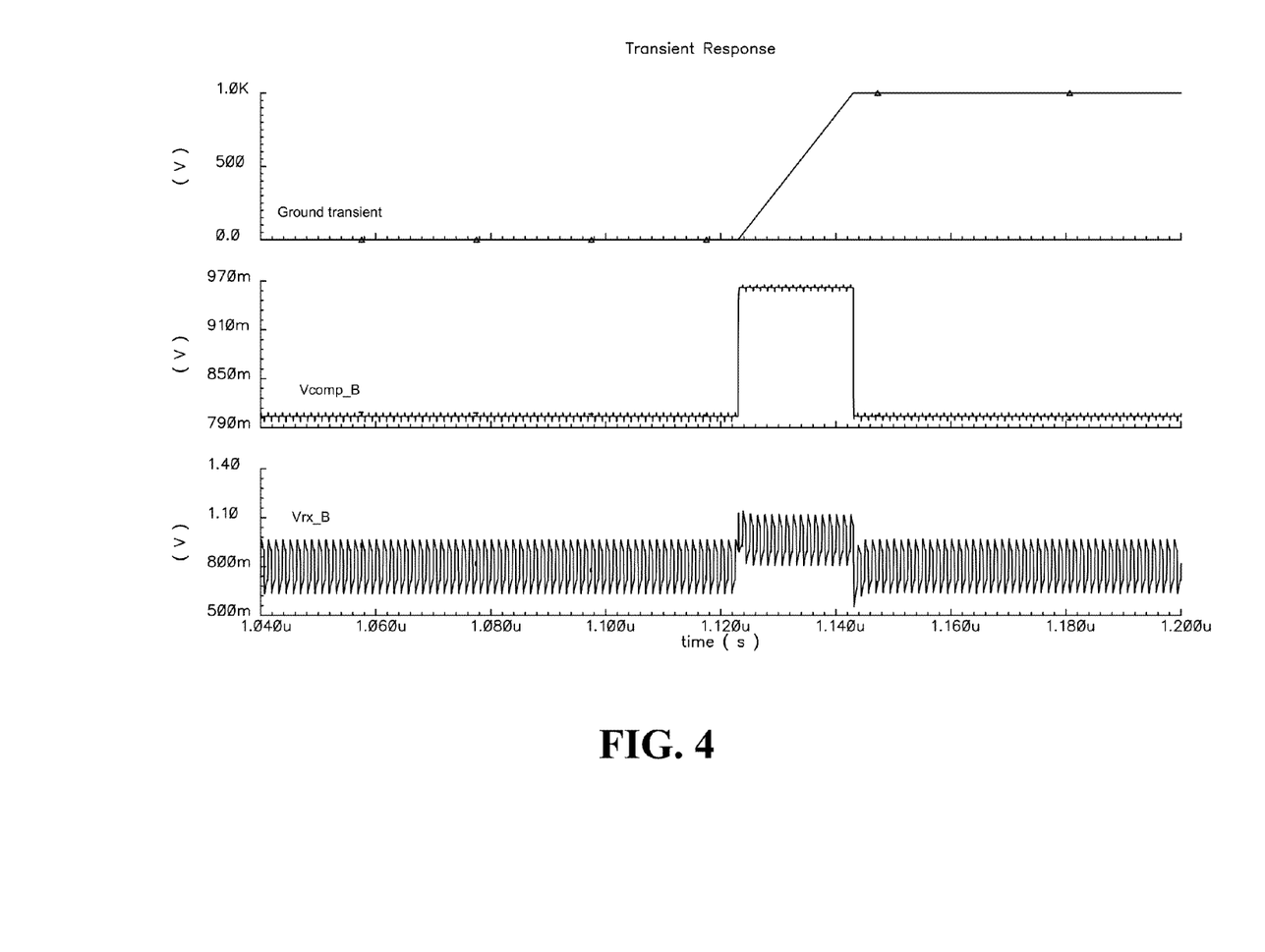
FIG. 4 shows waveforms representing correction of a ground transient using the circuit shown in FIG. 3, consistent with embodiments of the present disclosure.

FIG. 4 shows waveforms representing correction of a ground transient using the circuit shown in FIG. 3. The waveforms depict an occurrence and compensation for ground transient at nodes Vrx_B and VComp_B. Since the transconductance of all transconductance amplifier stages is finite, there will be some finite residue of the ground transient present on the nodes Vcomp_A, Vcomp_B, Vrx_A, and Vrx_B.

Figure 5:
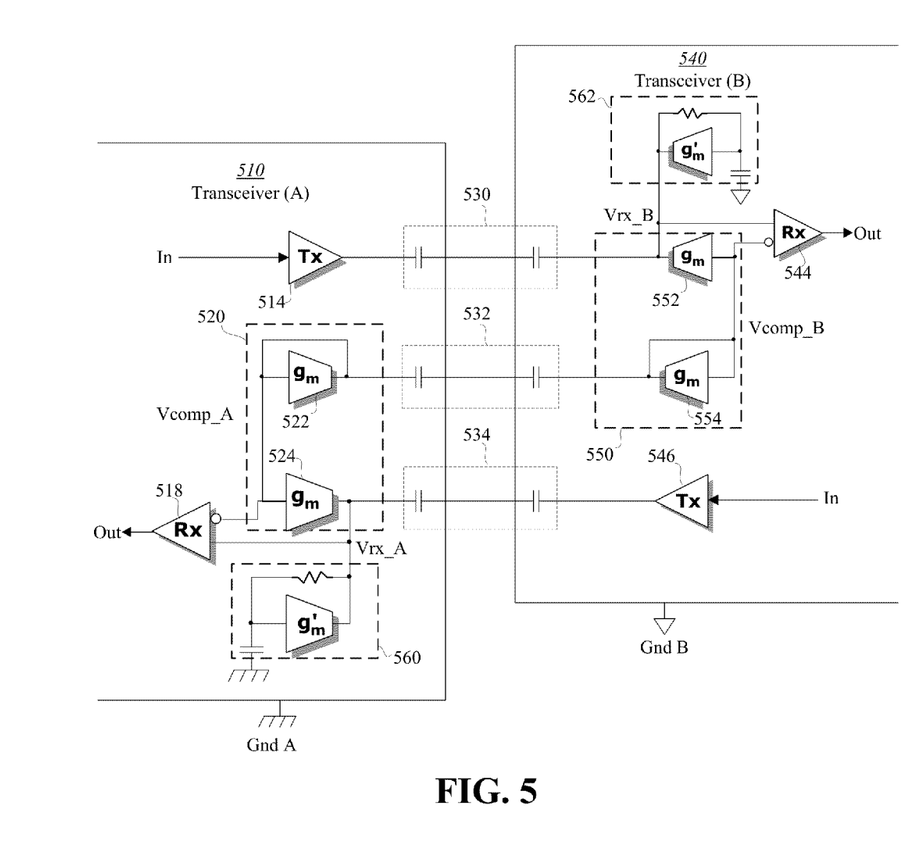
FIG. 5 shows a block diagram of a system for communication between voltage domains, consistent with embodiments of the present disclosure.

In some embodiments, transceiver circuits may be configured to subtract the transient residue from received non-differential signals using differential amplifiers. FIG. 5 shows a block diagram of a system for communication between voltage domains, consistent with embodiments of the present disclosure. Similar to the system described with reference to FIG. 1, the system shown in FIG. 5 includes first and second transceiver circuits (510 and 540) configured for bidirectional communication over three signal paths (530, 532, and 534). Each signal path capacitively couples transceiver A 510 and transceiver B 540.

The first transceiver 510 includes a transmitter circuit 514 configured to transmit signal data over a first one of conductive paths 530, and a receiver circuit 518 configured to receive signal data from a second one of the signal paths 534. The first transceiver 510 includes a compensation circuit 520 configured to generate a compensation signal based on ground transient voltage at a node (Vcomp_A) connected to the third signal path 532. The compensation circuit 520 is configured to transmit the compensation signal on the second signal path 534 to reduce ground transient voltage at node (Vrx_A). Similarly, the second transceiver 540 includes a receiver circuit 544 configured to receive signal data from the first one of conductive paths 530, and a transmitter circuit 546 configured to transmit signal data over second one of the conductive paths 534 to the first transceiver circuit 510. The second transceiver 540 includes a compensation circuit 550 configured to generate a compensation signal based on ground transient voltage at a node (Vcomp_B) connected to the third signal path 532. The compensation circuit 550 is configured to transmit the compensation signal on the second signal path 534 to reduce ground transient voltage at node (Vrx_B).

The receiver circuits (e.g., 544) are configured to subtract any ground transient voltage (e.g., Vcomp_B) from the input signal received from the capacitive-coupled signal path (e.g., 530).

In some embodiments, each transceiver circuit 510 and 540 may include a biasing circuit (e.g. 560/562) connected to a respective one of receiver input nodes (Vrx_A/Vrx_B) to better define the DC biasing voltage of the node. Because these nodes connect a respective output of a transconductance amplifier (524/552) to a respective capacitive-coupled signal path (534/530), respectively, nodes Vrx_A and Vrx_B are high-ohmic and not strongly defined for DC. For instance, leakage current, which might be produced at node Vrx_B due to mismatch between transconductance amplifiers 552 and 554, can be absorbed by a feedback loop operating at low frequencies (well below the chosen modulation frequency) that cleanly sets the DC voltage of the nodes Vrx_A and Vrx_B.

In certain instances, one or more embodiments can use different coding techniques and different types of circuits communicating data through the isolation region. The data communications can use analog, digital, RF, serial and/or parallel communication techniques. For certain high-speed applications, different types of modulation schemes can be used for carrying information across the isolation region, including but not limited to OOK (on-off keying), amplitude, phase-based and/or frequency-based. In some instances, communications can be carried out between multiple circuits placed within a single chip-package (e.g., BGA package) and also having galvanic isolation therebetween. The various communications can be carried out using different isolation buffer circuits and amplifiers. Various applications are also contemplated including, but not limited to, applications in which small voltage differences exist between transmitters and receivers and applications in which large voltages can exist (e.g., hundreds of volts as can be used in automotive applications where electric motors are used in place of (or in combination with) combustion engines). Consistent with one or more embodiments discussed herein, U.S. Pat. No. 6,920,576 (filed May, 31, 2001; Ehmann, Gregory E.), U.S. Pat. No. 6,882,046 (filed Dec. 18, 2001; Davenport, et al.) and "Signal Isolation Buffer Amplifiers" Burr-Brown, ISO102, ISO106, January 1995, each describe useful technical details, applications and various background information, and each of these documents is fully incorporated herein by reference.

The embodiments are thought to be applicable to a variety of applications using galvanic isolation. Other aspects and embodiments will be apparent to those skilled in the art from consideration of the specification. While the present disclosure is amenable to various modifications and alternative forms, specifics thereof have been shown by way of example in the drawings and will be described in further detail. It should be understood that the intention is not to limit the disclosure to the particular embodiments and/or applications described. On the contrary, the intention is to cover all modifications, equivalents, and alternatives falling within the spirit and scope of the present disclosure.

What is claimed is:

1. A device configured for use with a plurality of signal paths providing capacitive isolation between devices communicating over the signal paths and comprising:
   a receiver circuit configured and arranged to receive signal data over a first path of the plurality of signal paths;
   a transmitter circuit configured and arranged to transmit signal data over a second path of the plurality of signal paths; and
   a compensation circuit configured and arranged to, in response to detecting ground transient on a third signal path:
   generate a compensation signal configured to compensate for ground transient voltage from signal data carried on the third signal path; and
   transmit the compensation signal over the first path of the plurality of signal paths to compensate for ground transient voltage from signal data carried on the first path.

2. The device of claim 1, further including:
   a second receiver circuit configured and arranged to receive signal data over the second path of the plurality of signal paths;

a second transmitter circuit configured and arranged to transmit signal data over the first path of the plurality of signal paths; and a second compensation circuit configured and arranged to generate a second compensation signal sufficient to compensate for ground transient voltage from signal data carried on the third path; and transmit the second compensation signal over the second path of the plurality of signal paths to compensate for ground transient voltage from signal data carried on the second path.

3. The device of claim 1, wherein:

the receiver circuit is configured and arranged to receive signal data over at least one additional path and to decode the signal data received from each path independently; and the compensation circuit is further configured and arranged to transmit the compensation signal on the at least one additional path.

4. The device of claim 1, wherein the signal data received on the first signal path and the signal data transmitted on the second signal path are non-differential signals.

5. The device of claim 4, wherein:

the receiver circuit is configured to subtract the ground transient voltage on the third path from the signal received on the first path.

6. The device of claim 5, further comprising a biasing circuit connected to an input of the receiver circuit, and configured and arranged to bias the input of the receiver circuit at a DC voltage.

7. The device of claim 6, wherein the biasing circuit includes a transconductance circuit having:

a voltage controlled input connected to a ground voltage via a capacitor;

an output connected to the input of the receiver circuit; and a feedback loop connecting the output of the transconductance circuit to the input of said transconductance circuit.

8. The device of claim 1, wherein:

the transmitter circuit and the receiver circuit operate in a first voltage domain; and a second transmitter circuit and a second receiver circuit operate in a second voltage domain that is different from the first voltage domain.

9. The device of claim 1, wherein:

the compensation circuit includes first and second transconductance stage circuits;

an output of the first transconductance circuit is connected to the third signal path, to an input of the first transconductance circuit, and to an input of the second transconductance circuit; and an output of the second transconductance circuit us connected to the first signal path.

10. The device of claim 9, wherein the first transconductance stage circuit is connected in a unity gain configuration.

11. A communication system, comprising:

first and second single-ended signal lines; and a communication device connected to the first and second signal lines and configured and arranged to:

receive and decode signals from the first single-ended signal line;

detect ground transients on the second single-ended signal line;

based on voltage of the second single-ended signal line, generate a first compensation signal configured to compensate for the ground transients on the second single-ended signal line; and transmit a second compensation signal, equal to the first compensation signal, on the first single-ended signal line.

12. The communication system of claim 11, wherein the communication device is configured to receive and decode signals from the first single-ended signal line that are non-differential.

13. The communication system of claim 11, wherein the communication device includes:

a receiver circuit configured and arranged to perform the receiving and decoding of the signals from the first single-ended signal line; and a first transconductance circuit having an output coupled to the second single-ended signal line and configured and arranged to:

detect the ground transients on the second signal-ended signal line; and based on voltage of the second single-ended signal line, generate the first compensation signal configured to compensate for the ground transients on the second signal-ended signal line; and a second transconductance circuit having an output coupled to the first single-ended signal line, and configured to transmit the second compensation signal, equal to the first compensation signal, on the first single-ended signal line.

14. The communication system of claim 13, wherein the first and second transconductance circuits each have an input connected to the output of the first transconductance circuit.

15. The communication system of claim 13, wherein the receiver circuit is configured to subtract the ground transients detected on the second signal-ended signal line from the signals received from the first single-ended signal line.

16. The communication system of claim 15, wherein the communication device further includes a biasing circuit connected to an input of the receiver circuit, and configured and arranged to bias the input of the receiver circuit at a DC voltage.

17. The communication system of claim 16, wherein the biasing circuit includes a third transconductance circuit having:

a voltage controlled input connected to a ground voltage via a capacitor;

an output connected to the input of the receiver circuit; and a feedback loop connecting the output of the third transconductance circuit to the input of said third transconductance circuit.

18. The communication system of claim 16, wherein the first transconductance circuit is connected in a unity gain configuration.

19. The communication system of claim 11, further comprising a third single-ended signal line; and wherein the communication device is further configured and arranged to:

receive and decode signals from the third single-ended signal line, and transmit a third compensation signal, equal to the first compensation signal, on the third single-ended signal line.

* * * * *